W. J. HIGMAN.
CUSHIONED WHEEL FOR VEHICLES.
APPLICATION FILED FEB. 18, 1909.

941,453.

Patented Nov. 30, 1909.

2 SHEETS—SHEET 1.

Witnesses:
G. Sargent Elliott.
Adella M. Towle.

Inventor:
William J. Higman
By H. S. Bailey. Attorney.

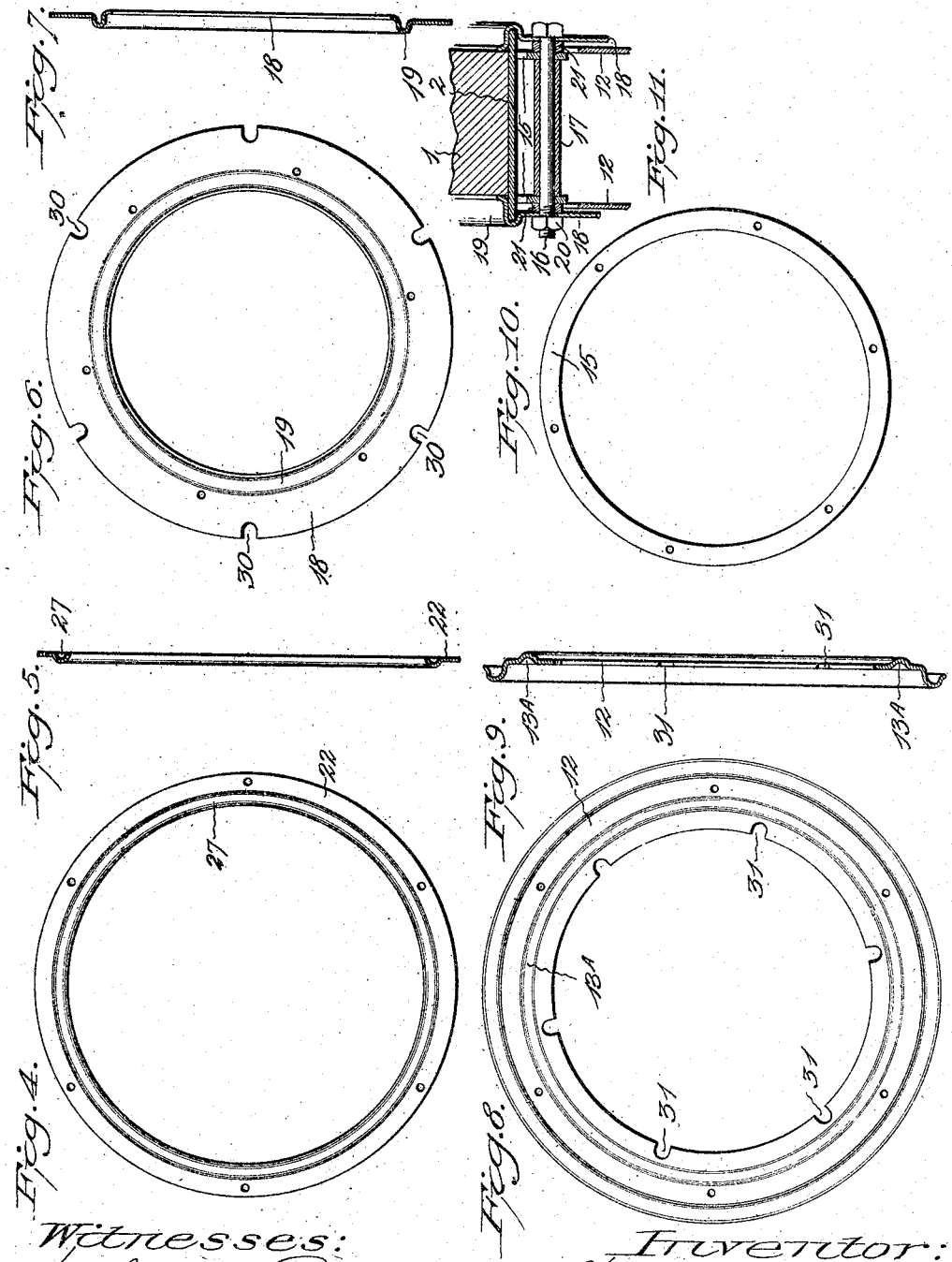

UNITED STATES PATENT OFFICE.

WILLIAM J. HIGMAN, OF DENVER, COLORADO.

CUSHIONED WHEEL FOR VEHICLES.

941,453.

Specification of Letters Patent.

Patented Nov. 30, 1909.

Application filed February 18, 1909. Serial No. 478,615.

*To all whom it may concern:*

Be it known that I, WILLIAM J. HIGMAN, a citizen of the United States of America, residing in the city and county of Denver and State of Colorado, have invented a new and useful Cushioned Wheel for Vehicles, of which the following is a specification.

This invention relates to improvements in cushioned wheels.

Figures 2, 3:
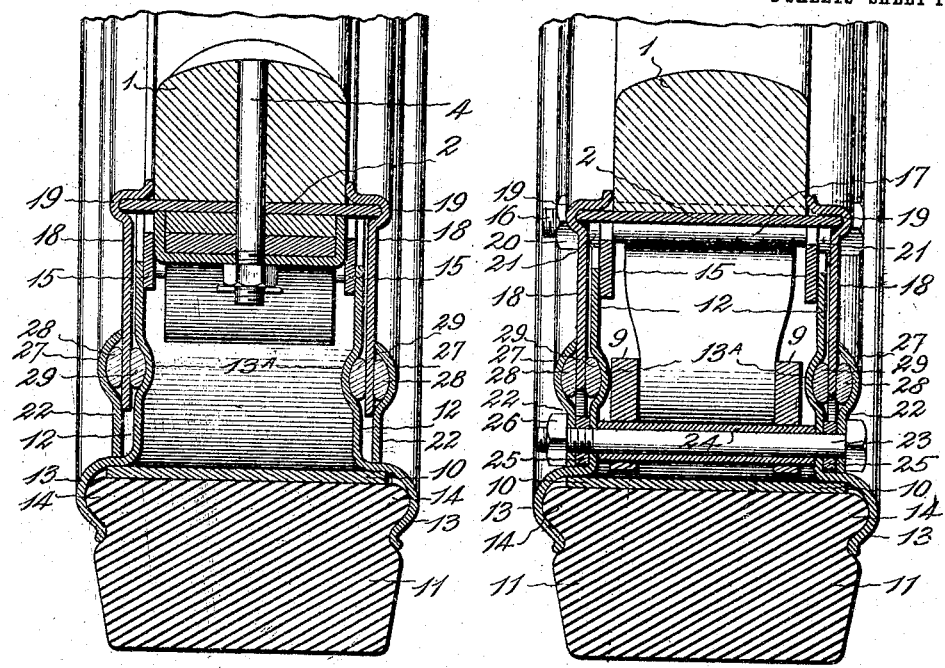
Figure 1:
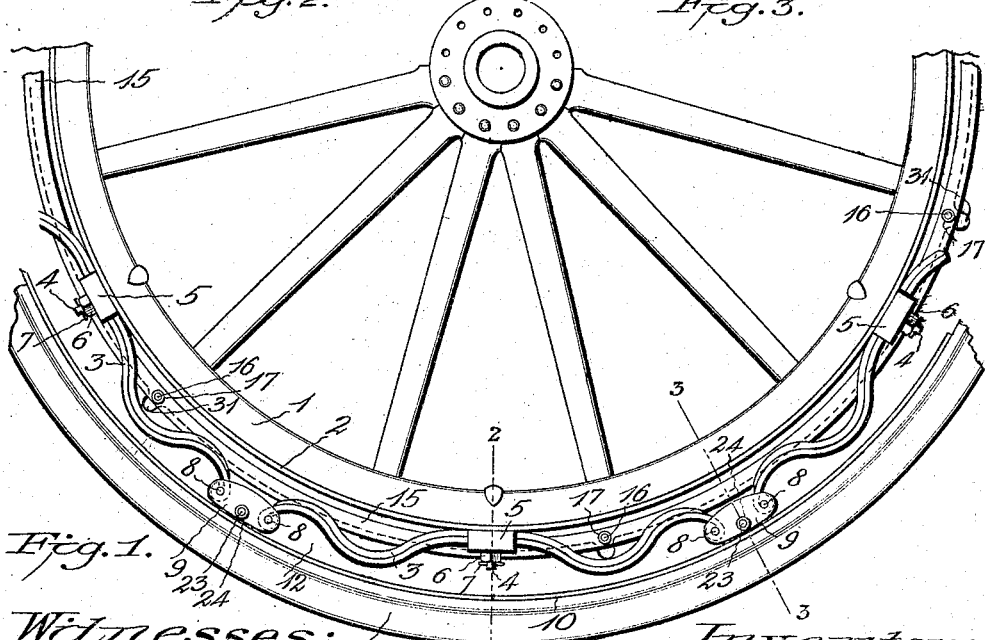

The object of the invention is to provide a device of this character, consisting of a wheel of substantially ordinary construction, and a tire of greater diameter than said wheel, which encircles it, and is maintained in a position concentric thereto, when the wheel is free from pressure, by a series of suitably curved springs, interposed between the tire and wheel, said springs being secured midway of their ends to the wheel, while their ends are connected by suitable coupling devices to the adjacent ends of similar springs, thus producing a series of connected springs which not only are compressible under pressure, but are adapted to expand or contract throughout their length, so that the action of each spring is communicated to the next adjoining spring, as the wheel turns, means being employed for housing the springs and for holding the tire in line with the wheel, the arrangement being fully set forth in the accompanying drawings, in which:

Figure 1, is a side elevation of a portion of a wheel constructed in accordance with my invention, the circular housing plates on one side of the wheel being removed to show the arrangement of the cushioning springs. Fig. 2, is a transverse sectional view, enlarged size, on the line 2—2 of Fig. 1. Fig. 3, is a similar view on the line 3—3 of Fig. 1. Fig. 4, is a front elevation on a much smaller scale, of one of the rings which form a lateral stay or support for the outer pair of housing plates. Fig. 5, is a transverse sectional view thereof. Fig. 6, is a front view of one of the outer housing plates. Fig. 7, is a transverse sectional view thereof. Fig. 8, is a front view of one of the inner housing plates. Fig. 9, is a transverse sectional view thereof. Fig. 10, is a front view of one of the stay rings against which the inner housing plates are supported. And Fig. 11, is a transverse sectional view showing the manner of connecting these rings.

Similar numerals of reference refer to similar parts throughout the several views.

Referring to the accompanying drawings, the numeral 1, designates the felly of an ordinary wheel, and 2, the tire, which is somewhat wider than the felly so as to project beyond each side of it. Upon the periphery of this tire is secured a plurality of substantially bow-shaped springs 3, an interval being left between the ends of one spring and those of the adjoining springs. Each spring, as illustrated, is made up of two leaves, and they are formed with a curved portion on each side of their centers, which permit of their being expanded or contracted lengthwise. The springs are provided with bolt holes, midway of their ends, and bolts 4 extend through the felly, the tire, and the leaves of the springs, and through U-shaped saddle plates 5, which confine the leaves and rest against the tire. Nuts 6, are screwed upon the bolts, and against the plates 5, and to prevent them from becoming detached from the bolts, split pins 7, are passed through apertures in the bolts, so as to lie against the nuts. The ends of the adjoining springs are pivotally secured upon bolts 8, which connect pairs of blocks 9, between which the ends of the springs are confined, and in this way the springs are connected to form a continuous cushioning medium around the periphery of the wheel.

A metal band 10 of greater diameter than the wheel tire, is placed around the springs, and this band is engaged and held in a position concentric with the wheel tire, by the ring plates 12. The several pairs of blocks 9, are mounted on bolts 23, which do not bear against the band 10, but which are held against the bolts 23 by the springs 3. Around the band is placed a tire 11, of rubber or other suitable material, and the band and tire are held against lateral movement relatively to the wheel, in the following manner: A pair of ring plates 12, are employed, which are pressed into the form shown in Figs. 8 and 9, to present annular hooked clenching portions 13, around their peripheral edges, which are U-shaped in cross section, and annular grooves or depressions 13<sup>A</sup> about midway of their widths. The tire is provided with annular ridges 14 and the plates 12 are placed one on each side of the tire, so that the clenching portions engage the ridges 14 and also the metal band 10. A pair of rings 15, of slightly greater diameter than the tire 2, are placed around the same, so as to lie one on each side of and against the several saddle plates 5, and these rings are connected by bolts 16, which pass through sleeves 17, which sleeves maintain a uniform space between the rings, and prevent them from being pressed toward each other. The inner portions of the ring plates 12, bear against and are prevented from being pressed toward each other, by the rings 15, as will clearly be seen by reference to Figs. 1, 2, and 3. A second pair of ring plates 18, are employed, and these plates are formed with annular grooves 19, about their inner edges, which are hook-shaped in cross section. One of these plates is placed on each side of the wheel, so that their hooked grooves 19 engage the extended edges of the tire 2, while their flat portions overlap the plates 12. The bolts 16, which pass through the rings 15, also pass through the plates 18, which are thus clamped upon the tire 2, by nuts 20. Washers 21, are interposed between the plates 18 and the rings 15, on the bolts 16, and prevent the plates 18 from being drawn together against the plates 12, when the nuts 20 are tightened upon the bolts 16. A suitable space is left between the inner edges of the plates 12 and the tire 2, and also between the outer edges of the plates 18 and the clenching portions of the plates 12, so that as the springs 3 are compressed under weight or by jolting of the vehicle, the wheel will be permitted to move toward the band 10 at the point of contact of the outer tire with the road.

The ring plates 18, are kept from spreading at their outer extremities, by rings 22, which lie against them, and these rings are held by bolts 23, which pass through sleeves 24, which sleeves pass through the blocks 9, and contact with the ring plates 12, which are thereby held in parallel relation. Washers 25 lie between the rings 22, and the plates 12, on the bolts 23, and when nuts 26 are screwed upon these bolts, the rings are clamped against the washers 25, and the washers against the plates 12, the sleeves 24 acting as abutments, and the grooved outer edges of the plates 12, clench the tire and hold it in place. The washers 25, prevent the rings 22 from being clamped against the plates 18, and the inner edges of these rings are formed with annular channels or grooves 27, which stand opposite the channels 13$^A$, or the ring plates 12, and suitable waterproof packing rings 28 are placed within these grooves, so as to bear against the outer faces of the plates 18, while similar packing rings 29 are placed in the grooves 13$^A$, and bear against the opposite faces of the plates 18, the latter rings being more particularly to prevent the noise which would otherwise occur, by contact of the plates 12 and 18, when the vehicle is in motion. The plates 12 and 18 form a housing for the springs 3, and prevent the entrance of dirt and moisture. The outer peripheral edges of the plates 18 are formed with recesses 30, which lie in radial lines, with the washers 25 on the bolts 23, and the inner edges of the plates 12 are formed with similar recesses 31, which lie in radial lines with the washers 21, on the bolts 16, and as the plates 12 and 18 slide one upon the other as the wheel turns, the washers slide into their respective recesses, in case of jars or sudden jolts, as the portion of the wheel beneath them contacts with the roadway, and thus the full movement of the plates is not interfered with.

The plates 12, clench and hold the tire 11 upon the band 10, and the plates 18 prevent lateral movement of the tire 11, relatively to the wheel.

In assembling the parts, the springs 3, are first attached to the wheel, in the manner described, and the rings 15 are placed around the wheel. The ring plates 12, are next placed in position, and the plates 18 are placed over the plates 12, and secured by bolts 16 and nuts 20. The rings 22 are then placed over the plates 18, and secured by the bolts 23, and nuts 26, the packing rings 28 and 29 and washers having been supplied in their proper order. As the wheel revolves, the springs 3 are successively compressed, more or less, according to the load in the vehicle, and the bouncing of the same due to the unevenness of the roadway, and as the springs are compressed, they also yield throughout their lengths, so that the cushioning action at the point of contact of the tire with the roadway is communicated in each direction, there being no break in the continuity of the action, which is continuous and uniform throughout.

The invention herein described, is simple in construction, and may be readily applied to wheels of ordinary construction.

Having described the invention, what I claim as new and desire to secure by Letters Patent, is:

1. The combination with a wheel, of a plurality of curved springs secured to the periphery of the wheel, midway of their lengths, and means for connecting the ends of the adjoining springs; a band around said springs in contact with the said connecting means; a tire on the band; ring plates having annular clenching grooves by which the tire is secured to the band, and which partially inclose the springs; ring plates secured to the wheel tire, which overlap the first ring plates, and means for holding them in parallel relation; rings overlapping the outer edges of said plates, and bolts which pass through said rings, and the first-mentioned ring plates to secure them against lateral movement.

2. The combination with a wheel, having a tire of greater width than its felly; of a plurality of curved springs secured to said wheel around said tire, midway of their ends; pairs of blocks between the ends of the adjoining springs and bolts connecting said blocks at opposite ends, to which the ends of the springs are secured; a band surrounding said springs and in contact with the said blocks; a tire on said band; circular clenching plates which clamp the tire to the band and partially inclose the springs, and means for securing them together and in parallel relation; circular plates having annular grooves which overlie the extended edges of the wheel tire, which plates overlap the clenching plates and means for holding them together and in parallel relation; grooved rings surrounding the outer edges of said plates, and held by the securing means of the clenching plates; a water-proof packing medium in the grooves of said rings, in contact with the adjacent plates; and a packing medium between each pair of said plates.

3. The combination with a wheel, having a tire which projects on each side beyond its felly, of a band surrounding said tire of greater diameter than the tire; circular ring plates secured upon the opposite edges of said band, of less width than the space between the band and tire; circular ring plates, which overlap the first plates, and are provided with annular hooked edges, which engage the extended edges of the wheel tire, and means including bolts for holding each pair of ring plates against lateral movement and in parallel order; a plurality of curved springs secured midway of their ends around the wheel tire; connecting devices between the ends of the adjoining springs, a central bearing bolt for supporting each connecting device, and a resilient tire upon said band.

4. The combination with a wheel having a tire of greater width than the felly, of a plurality of curved springs secured around said tire midway of their lengths; connecting devices between the ends of the adjoining springs, a band encircling said springs; a resilient tire on said band; ring plates having annular hooked outer edges adapted to engage the tire and band, and of less width than the space between the band and wheel tire; ring plates having hooked inner edges which engage the projecting edges of the wheel tire, and which overlap the first ring plate; said plates also being of less width than the space between the band and wheel tire; rings of slightly greater diameter than the wheel tire, which lie on either side of the springs and against the first mentioned plates; sleeves between said rings which hold them in parallel order; bolts which pass through said sleeves and the outside ring plates and washers on said bolts between the rings and the said plates; spacing sleeves between the inner plates; bolts passing through said plates and sleeves; ring plates surrounding the outer edges of the outside plates, through which the latter bolts also pass; a water-proof packing medium between said latter plates and the adjacent plates; and a packing medium between said inner and outer plates.

In testimony whereof I affix my signature in presence of two witnesses.

WILLIAM J. HIGMAN.

Witnesses:
G. SARGENT ELLIOTT,
ADELLA M. FOWLE.